March 18, 1958  H. D. GERSTUNG ET AL  2,826,903
OVERLOAD RELEASE CLUTCH
Filed March 8, 1955
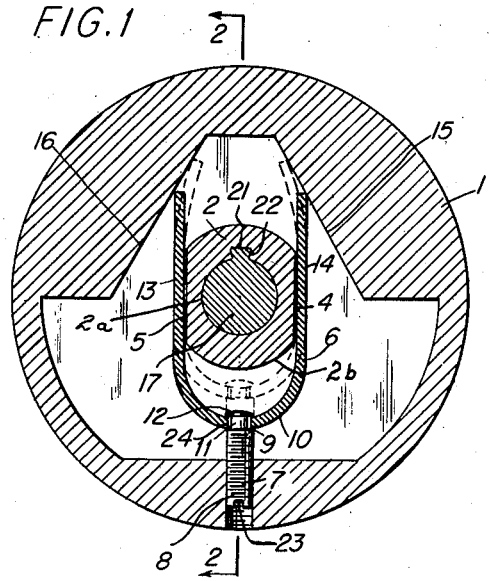
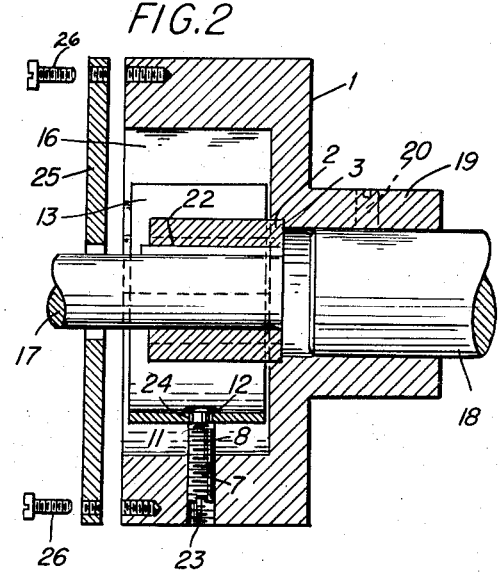
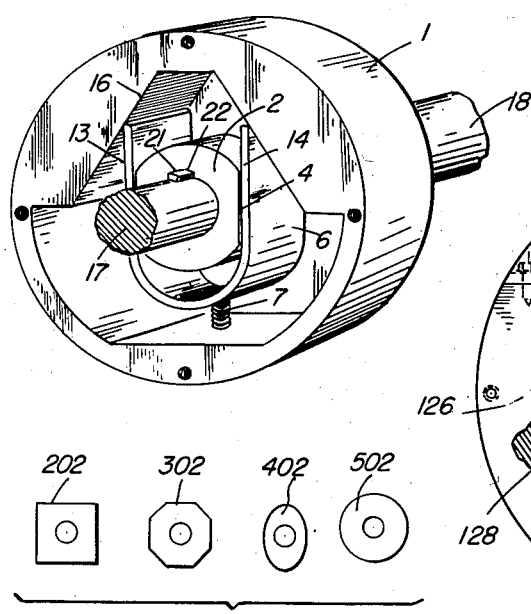
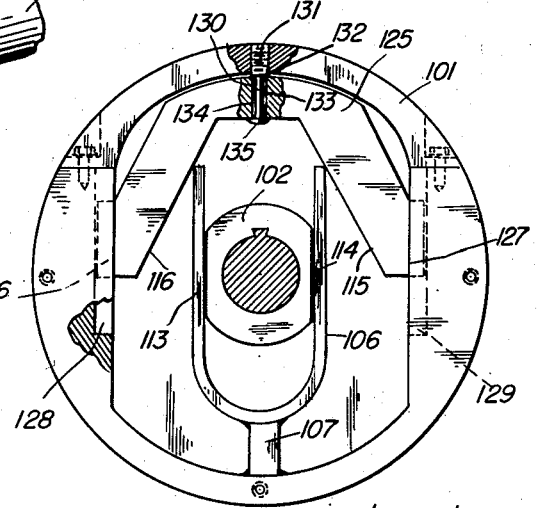
Inventors
Henry D. Gerstung
Edward T. Malmros
By their attorneys
Howson and Howson

United States Patent Office 2,826,903
Patented Mar. 18, 1958

2,826,903

OVERLOAD RELEASE CLUTCH

Henry D. Gerstung, Elizabeth, and Edward T. Malmros, Clark Township, Union County, N. J., assignors to Centric Clutch Company, Woodbridge, N. J., a corporation of New Jersey Application March 8, 1955, Serial No. 492,984

3 Claims. (Cl. 64—29)

This invention pertains to an overload release clutch.

In many industrial and domestic applications it is desirable to provide a mechanism for connecting a rotating driving member to a driven member which will disconnect when the load becomes too great, thus preventing damage to a prime mover or other driving elements. To meet this demand clutches have been designed which will disengage upon overload. However, to date many such clutches have been relatively expensive, approaching and even exceeding in certain cases, the cost of the prime mover itself. In other instances elaborate steps must be taken to reset the clutch once it has been disengaged. In still further designs the load, at which the clutch will disengage, varies greatly with the direction in which the clutch is turning. Finally, many existing types of overload release clutches are difficult to adjust with respect to the load at which they will disengage.

It is an object of the present invention to provide an overload release clutch which will be simple and economical to construct.

It is another object of the invention to provide an overload release clutch which will automatically reset.

It is another object of the invention to provide an overload release clutch which is truly bidirectional in that the load at which the clutch will disengage will be substantially the same, regardless of the direction in which the clutch is turning.

It is a further object of the present invention to provide an overload release clutch in which the load at which disengagement will occur may be easily adjusted.

According to the present invention these and other objects are achieved by an overload release clutch having a casing, a central member within said casing, and a U-shaped spring member within said casing and connected to said casing, said U-shaped member having two parallel arms bearing against opposite sides of said central member, normally to provide a torque transmitting connection between said central member and said casing, said central member being rotatable relative to said arms on overload.

Preferably the central member is cylindrical and has flats on opposite sides to cooperate with the arms of the spring member. In accordance with the invention means are preferably provided for forcing the arms of the spring toward each other, thus increasing the pressure with which the spring arms bear upon the central member and the load required to disengage the clutch. To accomplish this the casing may be provided with camming surfaces against which the arms of the spring member may be urged, to force them together. The spring member is preferably attached to the casing by a threaded shaft, operation of which moves it into contact with the camming surfaces. Alternatively the spring member may be fixedly attached to the casing and means provided for moving the camming surfaces into contact with the spring.

A more complete understanding of the invention may be gained from the drawing in which:

Fig. 1 is a vertical sectional view of the preferred form of the novel clutch;

Fig. 2 is a vertical section taken along the line 2—2 of Fig. 1, showing also a cover plate not shown in Fig. 1;

Fig. 3 is a perspective view of the clutch shown in Figs. 1 and 2;

Fig. 4 is a front elevational view, partly in section showing an alternate form of the novel clutch; and Fig. 5 shows several different shapes of central members which may be used in clutches according to the invention.

Referring to Figs. 1–3, an overload release clutch, according to the invention, comprises a casing 1, having a hub 19, and a central member 2. A seat 3 (Fig. 2) is provided within the casing for receiving the central member. In the embodiment of Figs. 1–3 the central member 2 is tubular in form and has a keyway 22 on its inner surface 2a, and flats 4 and 5 on opposite sides of its outer surface 2b.

A U-shaped spring member 6 is mounted on the inside of the casing 1 by means of a threaded shaft 7. The shaft 7 has a thick portion 8 ending in a shoulder 9, and a reduced portion 11. The thick portion 8 is threaded in the casing 1 and has a screwdriver slot 23. The spring member 6 has an aperture 24 in its lower section 10 which slips freely over the reduced portion 11 of shaft 7. The spring member when so mounted sits on the shoulder 9 of the shaft and is retained in that position by any convenient means, as for example, by peening over the reduced end of the shaft, as at 12. When the shaft is advanced inwardly through the casing 1, its shoulder 9 bears against the spring member 6 and forces it radially inwardly of the casing.

The spring member 6 has two arms 13 and 14 which normally bear against the flats 4 and 5 of the central member 2. The casing is provided with camming surfaces 15 and 16 arranged to cooperate with these arms. The camming surfaces may be formed as an integral part of the casing, as shown in Figs. 1–3, or may be formed on separate camming elements retained in the casing by any suitable means. A cover plate 25 may be provided to enclose the casing 1 and protect the operating parts. Screws 26 retain the cover plate on the casing.

To describe the operation of the novel clutch it will be assumed that it is desired to transmit power from a shaft 17 to a shaft 18 (Figs. 1–3). To accomplish this, the shaft 18 is inserted in hub 19 of the casing 1 and retained therein by means of a set-screw 20. The shaft 17 is inserted in the central member 2, a key 21 on the shaft locking in keyway 22 of the central member. When shaft 17 is rotated it carries with it central member 2. The flats on the member 2 bear against the arms 13, 14 of spring member 6 and through spring member 6 cause rotation of casing 1. Rotation of the casing 1 rotates shaft 18.

Should the load applied to shaft 18 exceed a predetermined maximum, continued rotation of shaft 17 and central member 2 will force apart the arms of spring member 6, and the central member 2 will rotate within the arms of the spring member. If the overload is removed, the arms 13 and 14 will re-engage the flats on the central member and the clutch will be automatically reset.

Should it be desired to increase the load at which the clutch will disengage, shaft 7 is advanced, by means of a screwdriver applied at slot 23. This causes movement of spring member 6 radially inwardly into a position indicated (in an exaggerated manner) by the dotted lines in Fig. 1. As the spring member is moved the ends of arms 13 and 14 are forced toward one another by camming surfaces 15 and 16, thus increasing the pressure exerted against the flats 4 and 5 and increasing the load necessary to cause central member 2 to rotate within the areas of the spring.

In like manner the disengagement load may be decreased by moving shaft 7 radially outwardly, allowing the arms 13 and 14 to separate somewhat and thus decreasing the pressure exerted by those arms against the flats 4 and 5.

Many variations of the construction shown in the drawing are possible within the scope of the invention. One alternate construction is shown in Fig. 4. The clutch of Fig. 4 comprises a casing 101, a central member 102 and a spring member 106. In the embodiment of Fig. 4 a U-shaped spring 106 is fixedly attached to the casing 101 by means of a shaft 107, and camming surfaces 115 and 116 are formed on a movable cam block 125. The block 125 is provided with tongues 126 and 127, which engage slots 128 and 129 in casing 101 to provide a guide for the movement of the block. The block is moved along slots 128 and 129 by means of a shaft 130. This shaft has a thick portion 131, a shoulder 132 and a reduced portion 133. The thick portion 131 is threaded in the casing 101, and the reduced portion is fitted freely in an aperture 134 provided in the block 125. When the shaft is properly positioned its shoulder 132 abuts the block 125. It may be retained in this position by any suitable means, as for example, by peening over the reduced end of the shaft as at 135.

The operation of the embodiment of Fig. 4 in transmitting power is thought obvious from the descriptions given in connection with Figs. 1–3. When it is desired to increase the load at which disengagement will occur in the embodiment of Fig. 4, shaft 130 is advanced radially inwardly, forcing block 125 inwardly. The arms 113 and 114 of spring member 106 are thus forced together and the pressure exerted to prevent member 102 from rotating within arms 113 and 114 is increased. Movement of shaft 107 and block 125 radially outwardly allows arms 113 and 114 to separate, releases the pressure on member 102 and decreases the release torque.

Other modifications of the invention are possible and will readily occur to those skilled in the art. For example, various shapes of central members may be used. Some of these are illustrated in Fig. 5. Referring to Fig. 5, a square member is shown at 202, a polygonal member at 302, an oval member at 402 and a round member at 502.

In the description of Figs. 1–3, the shaft 17 connected with the central member 2 is indicated as a driving member and shaft 18 connected with the casing 1 as a driven member. Obviously the driving force might be applied to the casing just as well without departing from the invention. Thus where in the specification and claims the central member is described as being rotatable relative to the arms of the spring member on overload, it is obvious that this includes the case where the casing and the spring member rotate relative to an outside reference point but the central member is held fast, as well as to the case where the central member rotates relative to an external reference point but the casing and spring member stand still.

Similarly in the drawings, the central member and the hub of the clutch casing have been shown as collars adapted to receive the shafts. Obviously however, they might be the hubs of pulleys or any other elements adapted to transmit rotational motion, without departing from the spirit of the invention.

The present invention thus provides an overload release clutch which is simple and certain in its operation and economical to build. If disengaged by overload it will automatically reset upon removal of the overload without the intervention of an attendant. The clutch is symmetrical (about the axis 2—2 in Fig. 1) and is therefore fully bidirectional in that the overload required for release is substantially the same regardless of whether the clutch is rotating clockwise or counter-clockwise. Adjustment of the load at which release will occur can be varied over a considerable range, from outside the casing, with a tool no more complicated than a screwdriver.

What is claimed is:

1. An overload release clutch comprising a casing, a central member within said casing, and a U-shaped spring member within said casing and connected to said casing, said U-shaped member having two arms bearing on opposite sides of said central member, normally to provide a torque transmitting connection between said central member and said casing, said central member and said casing being rotatable relative to one another on overload, in combination with means for forcing said arms toward one another, and thereby increasing the pressure exerted by said arms on said central member and the load at which said central member and said casing will rotate relative to one another, said last named means comprising camming surfaces and means for forcing the arms of said spring member against said surfaces.

2. An overload release clutch comprising a casing, a central member within said casing, and a U-shaped spring member within said casing and connected to said casing, said U-shaped member having two arms bearing on opposite sides of said central member, normally to provide a torque transmitting connection between said central member and said casing, said central member and said casing being rotatable relative to one another on overload, in combination with means for forcing said arms toward one another, and increasing the pressure exerted by said arms on said central member and the load at which said central member and said casing will rotate relative to one another, said last named means comprising a cam block having camming surfaces and means for moving said cam block to force said camming surfaces against the arms of said spring member.

3. An overload release clutch comprising a casing, a central cylindrical member seated within said casing and having flats on opposite sides thereof, a U-shaped spring member within said casing and connected to said casing, said spring member having two arms bearing on the flats of said central member, normally to provide a torque transmitting connection between said casing and said central member, but on overload to permit relative rotation between said casing and said central member, in combination with means to vary the pressure exerted by said arms on the flats of said central member and thereby to vary the load at which said relative rotation will occur, said last named means comprising camming surfaces in said casing and screw means for forcing said arms against said camming surfaces.

References Cited in the file of this patent

UNITED STATES PATENTS

| | | |
|---|---|---|
| 2,472,659 | Greer | June 7, 1949 |
| 2,503,189 | Biba, Jr. | Apr. 4, 1950 |
| 2,688,857 | Jones | Sept. 14, 1954 |